United States Patent [19]
Lee

[11] Patent Number: 5,855,088
[45] Date of Patent: Jan. 5, 1999

[54] OUTRIGGER PIVOT ASSEMBLY

[76] Inventor: Terry R. Lee, 10347 SW. 118th St., Miami, Fla. 33176

[21] Appl. No.: 2,328

[22] Filed: Jan. 2, 1998

[51] Int. Cl.$^6$ .................................................... A01K 97/12
[52] U.S. Cl. ............................................................ 43/21.2
[58] Field of Search ................................ 43/15, 16, 21.2; 248/518, 523, 538, 534, 514, 515; 224/281, 282

[56] References Cited

U.S. PATENT DOCUMENTS

| | | | |
|---|---|---|---|
| 3,802,112 | 4/1974 | Banner | 43/21.2 |
| 4,528,768 | 7/1985 | Anderson | 43/21.2 |
| 5,359,802 | 11/1994 | Gutierrez | 43/16 |
| 5,460,306 | 10/1995 | Rudd | 224/557 |
| 5,560,137 | 10/1996 | Herring | 43/21.2 |

*Primary Examiner*—Thomas Price
*Attorney, Agent, or Firm*—Malloy & Malloy, P.A.

[57] ABSTRACT

An outrigger pivot assembly structured to rotatably support an outrigger fishing assembly having a shaft bottom end, the pivot assembly including a support housing coupled to a support surface of a boat and structured to generally receive and support a positioning member therein. The positioning member, which is coupled with the shaft bottom end of the outrigger fishing assembly, is structured to rotate the outrigger fishing assembly upon rotation thereof relative to the support housing. A outrigger pivot assembly further includes a handle assembly structured to rotate the positioning member and outrigger fishing assembly upon pivoted movement thereof about a perimeter of the support housing, and a lock assembly having a channel with at least a first position, a second position and a connection segment wherethrough the handle assembly is structured to selectively move when not being retained in place as a result of a structure of said lock assembly.

13 Claims, 4 Drawing Sheets

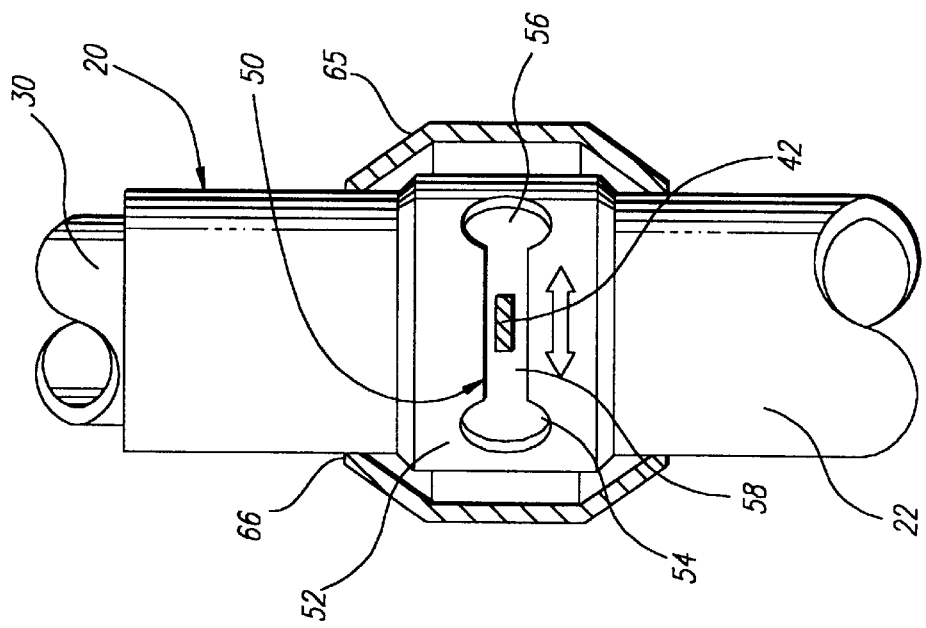
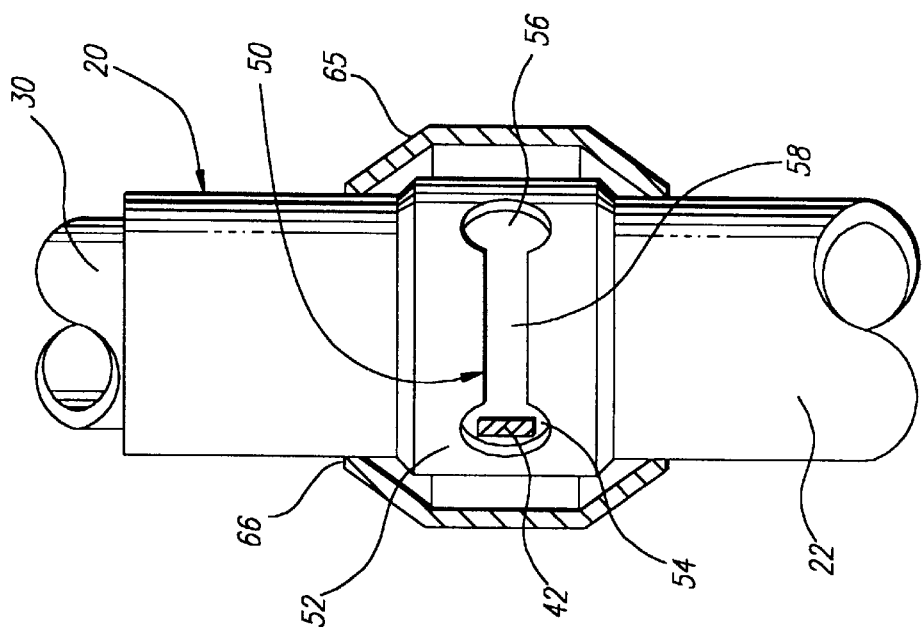
FIG. 4
FIG. 3

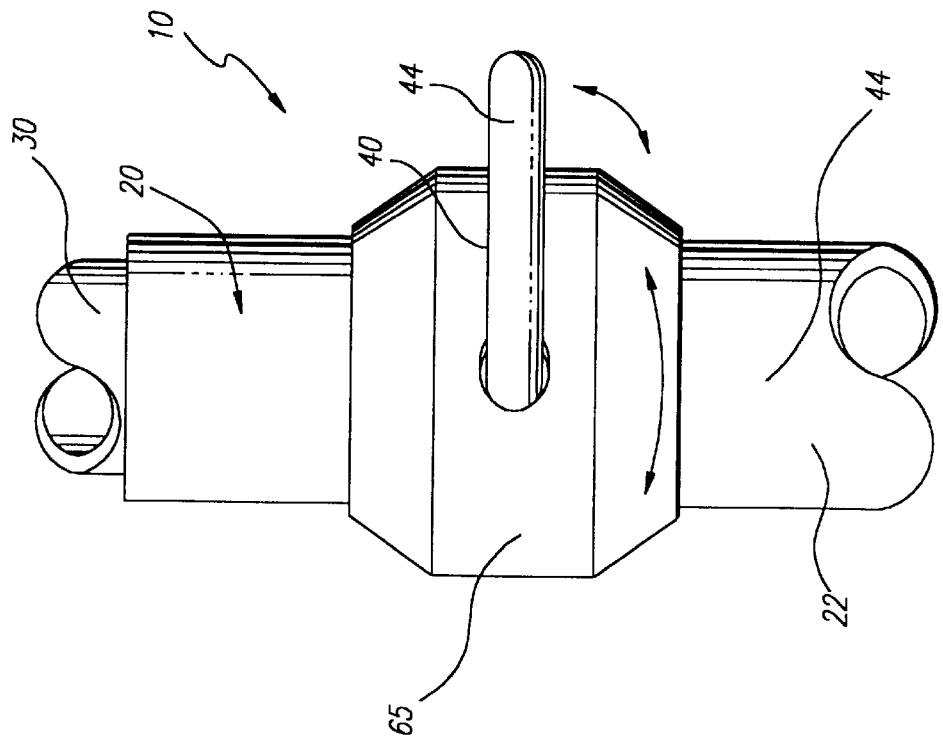
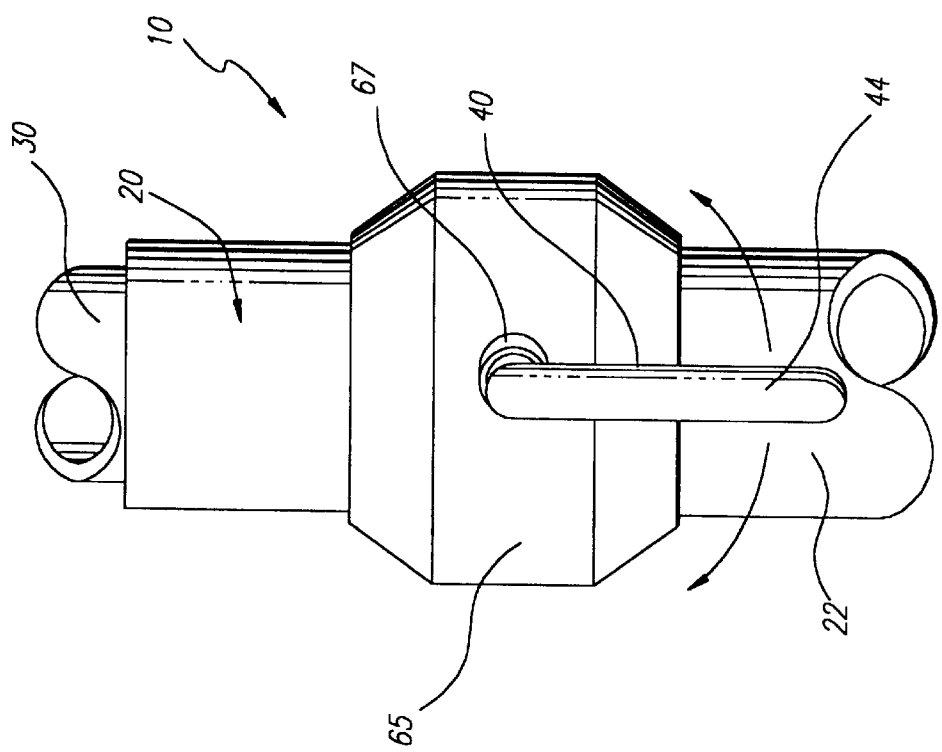

OUTRIGGER PIVOT ASSEMBLY

BACKGROUND OF THE INVENTION

1. Field of the Invention

The present invention relates to an outrigger pivot assembly which is structured to facilitate the pivoted movement of an outrigger fishing assembly between a stowed orientation and a extended orientation, and which is substantially cost effective to utilize and manufacture, is substantially free from mechanical breakdown, and is substantially secure so as to lock the outrigger fishing assembly in a desired position without risk of slippage or accidental pivoting and without requiring extensive locking assemblies.

2. Description of the Related Art

Outrigger fishing assemblies are commonly used devices in both recreational and commercial fishing situations. Specifically, these outrigger fishing assemblies are utilized so as to maximize the number of lines which a fishing boat has in the water, while minimizing the risk of entanglement between these lines. As such, in a normal operative orientation, the outrigger fishing assemblies tend to be extended outwardly away from the boat, leading the fishing line into the water at a generally spaced apart distance and orientation from the boat. Of course, however, it is not acceptable for these outrigger fishing assemblies to be fixed in their extended orientation, especially if the boat is passing through narrow waterways or is docking. As a result, it is necessary for the outrigger fishing assembly to be able to pivot inwardly towards the boat and into a stowed orientation if a user is going to avoid complete removal of the outrigger fishing assembly from its supported orientation. To this end, a variety of pivoting assemblies have been developed so as to provide for facilitated pivoted movement of the outrigger fishing assembly, and the field of art associated therewith is naturally quite crowded.

Of the substantial amounts of outrigger pivot assemblies presently available, some primary drawbacks associated therewith are the potential for slippage and accidental movement of the outrigger fishing assembly into and out of the stowed orientation, the need for specialized hubs, and the general mechanical complexity of the assemblies, which can lead to higher costs, mechanical breakdown, slippage, wear, or sticking. Indeed, some such devices, in an attempt to overcome the general short comings of the industry, have become quite complex, requiring elaborate, specialized mating hub designs, and requiring a great degree of manipulation during locking, unlocking, and the like in order to achieve the necessary pivotal movement.

For the preceding reasons it would be highly beneficial to provide an outrigger pivot assembly which is substantially easy and cost effective to machine, manufacture and utilize, yet which is highly effective for use. Such a device should not rely on clamping mechanisms and the like which function as a result of friction and can be subject to slippage or premature wear, and should be substantially durable, withstanding many years of continuous use. Furthermore, such a device should provide for substantially secure and stable locked engagement thereof in a desired orientation, but should also have an aesthetically appealing, uniform exterior appearance wherein the locking mechanism is shielded from visibility or damage as a result of external forces and is maintained in a properly aligned and oriented configuration for pivoting. Also, such a device should be usable with existing or only slightly modified hub type assemblies, which are often somewhat permanently or fixedly secured to the outrigger fishing assemblies, thereby eliminating the cost of new tooling or hub purchases when utilized with existing outrigger fishing assemblies. The device of the present invention provides such an outrigger pivot assembly.

SUMMARY OF THE INVENTION

The present invention relates to an outrigger pivot assembly. Specifically, the outrigger pivot assembly is structured to rotatably support an outrigger fishing assembly of the type having a shaft bottom end, in order to permit the outrigger fishing assembly to pivot between a stowed orientation and an extended orientation. Particularly, the outrigger pivot assembly of the present invention includes a support housing. The support housing, which is coupled to a support surface, such as the floor, side or roof of a boat, is structured to directly or indirectly support the outrigger fishing assembly.

Furthermore, the outrigger pivot assembly has a hub which includes a positioning member. The positioning member, which is structured to be coupled with the support housing, is further structured to receive the shaft bottom end supportably therein and to rotate the outrigger fishing assembly upon rotation thereof. As such, the positioning member is structured to rotate relative to the support housing.

Extending out from the support housing and structured to rotate the positioning member, and accordingly the outrigger fishing assembly, is a handle assembly. Specifically, the handle assembly is structured to pivot relative to and about a perimeter of the support housing, and to correspondingly rotate the positioning member upon that pivotal movement.

In order to selectively retain the handle member in a desired position corresponding the stowed and the extended orientations of the outrigger fishing assembly, a lock assembly is provided. Specifically, the lock assembly includes at least a first position and a second position and is structured so as to retain the handle assembly correspondingly in the first or second positions unless affirmatively removed, thereby preventing inadvertent movement out of those respective positions during use or during movement of the boat. To this end, the lock assembly includes a channel defined in the support housing. The channel defines the first position, the second position and a connection segment communicably disposed therein between the first and second positions. Furthermore, the handle assembly is structured so as to selectively move through the connection segment, only upon affirmative actuation by a user, and thereby correspondingly move between the first and second positions.

It is an object of the present invention to provide an outrigger pivot assembly which is substantially cost effective to manufacture, including relatively few, relatively simple moving component parts.

Another object of the present invention is to provide an outrigger pivot assembly which provides for substantially stable positioning of the outrigger fishing assembly between a stowed and an extended orientation.

Yet another object of the present invention is to provide an outrigger pivot assembly which is not susceptible to inadvertent pivoted movement, but rather requires affirmative actions on behalf of a user.

Also an object of the present invention is to provide an outrigger pivot assembly which does not require complex retention elements in order to be securely maintained in a locked orientation wherein the outrigger fishing assembly is not permitted to rotate.

An added object of the present invention is to provide an outrigger pivot assembly which is substantially secure and effective, and which includes an aesthetically appealing exterior appearance.

A further object of the present invention is to provide an outrigger pivot assembly which is substantially quick and easy to manipulate in order to provide for effective pivoted movement of an outrigger fishing assembly between a stowed and an extended orientation.

Yet another object of the present invention is to provide an outrigger pivot assembly which maintains relatively smooth, fluid and aligned pivoted movement of the outrigger fishing assembly.

Also an object of the present invention is to provide an outrigger pivot assembly which does not require substantial, if any, modification to existing hub designs.

BRIEF DESCRIPTION OF THE DRAWINGS

For a fuller understanding of the nature of the present invention, reference should be had to the following detailed description taken in connection with the accompanying drawings in which:

FIG. 3 is a view along line A—A of FIG. 2 illustrating a locked orientation;

FIG. 4 is a view along line A—A of FIG. 2 illustrating an unlocked orientation;

FIG. 5 is an isolated perspective view illustrating the handle assembly in the locked orientation;

FIG. 6 is an isolated perspective view illustrating the handle assembly in an unlocked and pivoting orientation.

Like reference numerals refer to like parts throughout the several views of the drawings.

DETAILED DESCRIPTION OF THE PREFERRED EMBODIMENT

The present invention is directed towards an outrigger pivot assembly generally indicated as 10. Specifically, the outrigger pivot assembly 10 is structured to rotatably support an outrigger fishing assembly 70 in order to enable the outrigger fishing assembly 70 to pivot between a stowed orientation, which is generally parallel with a boat, and a deployed or extended orientation, which is angled away from the boat and may indeed be at a perpendicular orientation to the boat such that a fishing line extending from a fishing rod portion 76 of the outrigger fishing assembly 70 enters the water a spaced apart distance from the boat.

The outrigger pivot assembly 10 of the present invention includes a support housing 20. The support housing 20 preferably includes a strong, solid tubular configuration, such as formed from aluminum or stainless steel. Moreover, the support housing is structured to preferably indirectly support the outrigger fishing assembly 70 in its operative orientation on a boat.

Figure 1:
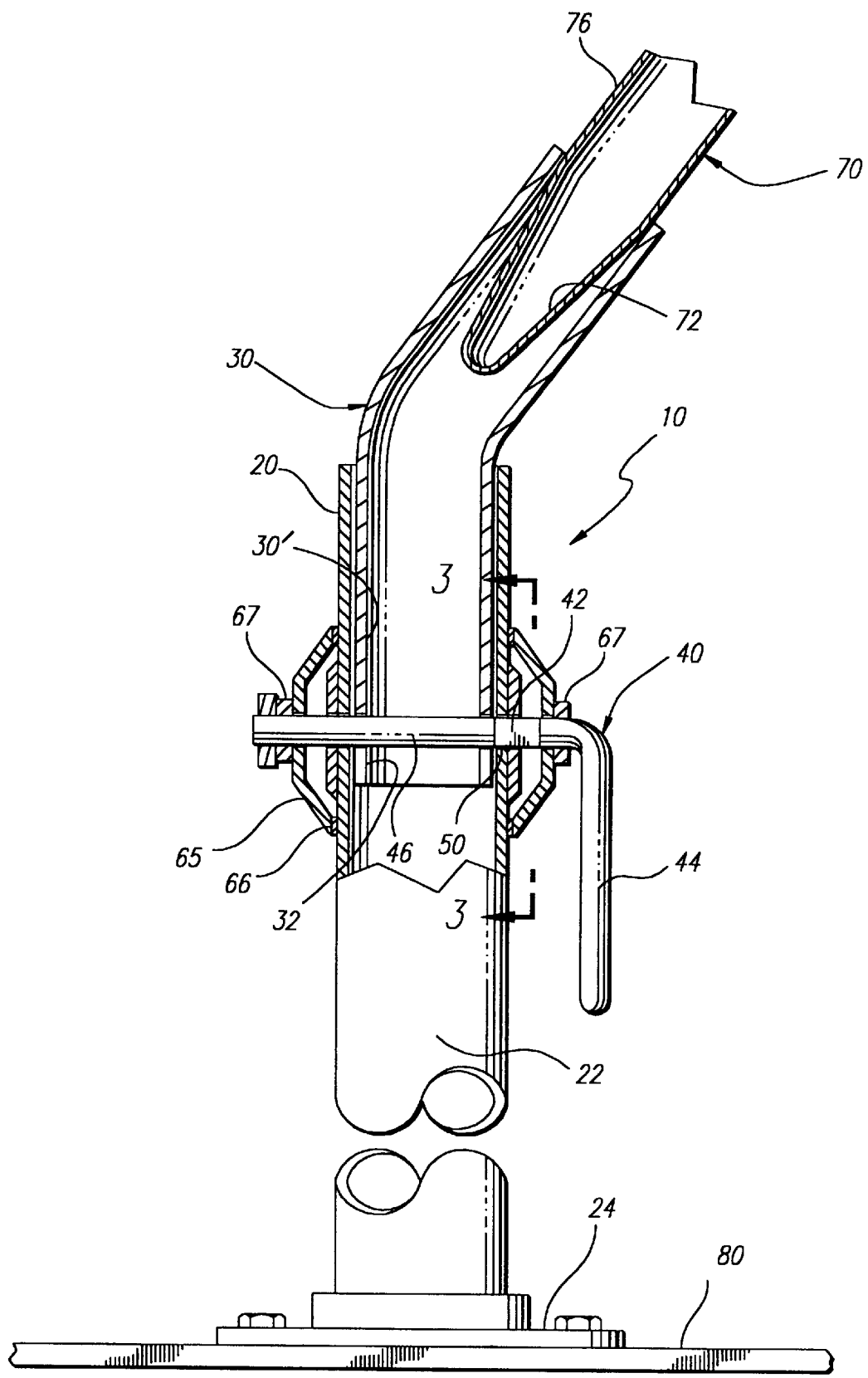
FIG. 1 is a perspective partial cutaway view of the outrigger pivot assembly of the present invention.

Specifically, as noted in FIG. 1, the support housing 20 is structured to be coupled to a support surface 80, such as a floor or other support surface of a boat. Indeed, in the preferred embodiment, the support housing is directly coupled via a substantially elongate support extension 22. The elongate support extension 22, which may extend integrally or separately from the main portion of the support housing 20, elevates the support housing 20 to a desired elevated orientation, such as at a roof of the boat. In this regard, the support housing 20 may be seen to extend completely or partially through the roof of the boat such that the outrigger fishing assembly 70 extends from above the roof.

Preferably structured to extend concentrically into the preferably tubular support housing 20 is a positioning member 30. The positioning member 30, which is of the general nature of a conventional hub and may include a variety of differing configurations, is structured to be generally coupled with the shaft bottom end 72. In particular, the positioning member 30 is structured to receive the shaft bottom end 72 of the outrigger fishing assembly 70 therein and may indeed be secured thereto, such as by a press fit or bolted engagement. Furthermore, the positioning member 30 preferably incorporates a generally curved or arcuate configuration so as to angle the outrigger fishing assembly 70 along a vertical plane. As such, in the preferred embodiment, the positioning member 30 curves into and extends into the preferably vertically disposed support housing 20, which preferably retains a lower end 30' of the positioning member 30, and accordingly the outrigger fishing assembly 70, therein, even with the weight of a fish or the general weight of the outrigger fishing assembly 70 as the boat moves and/or bounces over waves. It should be noted that although it is preferred that the positioning member 30 extend into the support housing 20, it may also be configured to pass over and receive the support housing 20 therein.

Figures 2, 7:
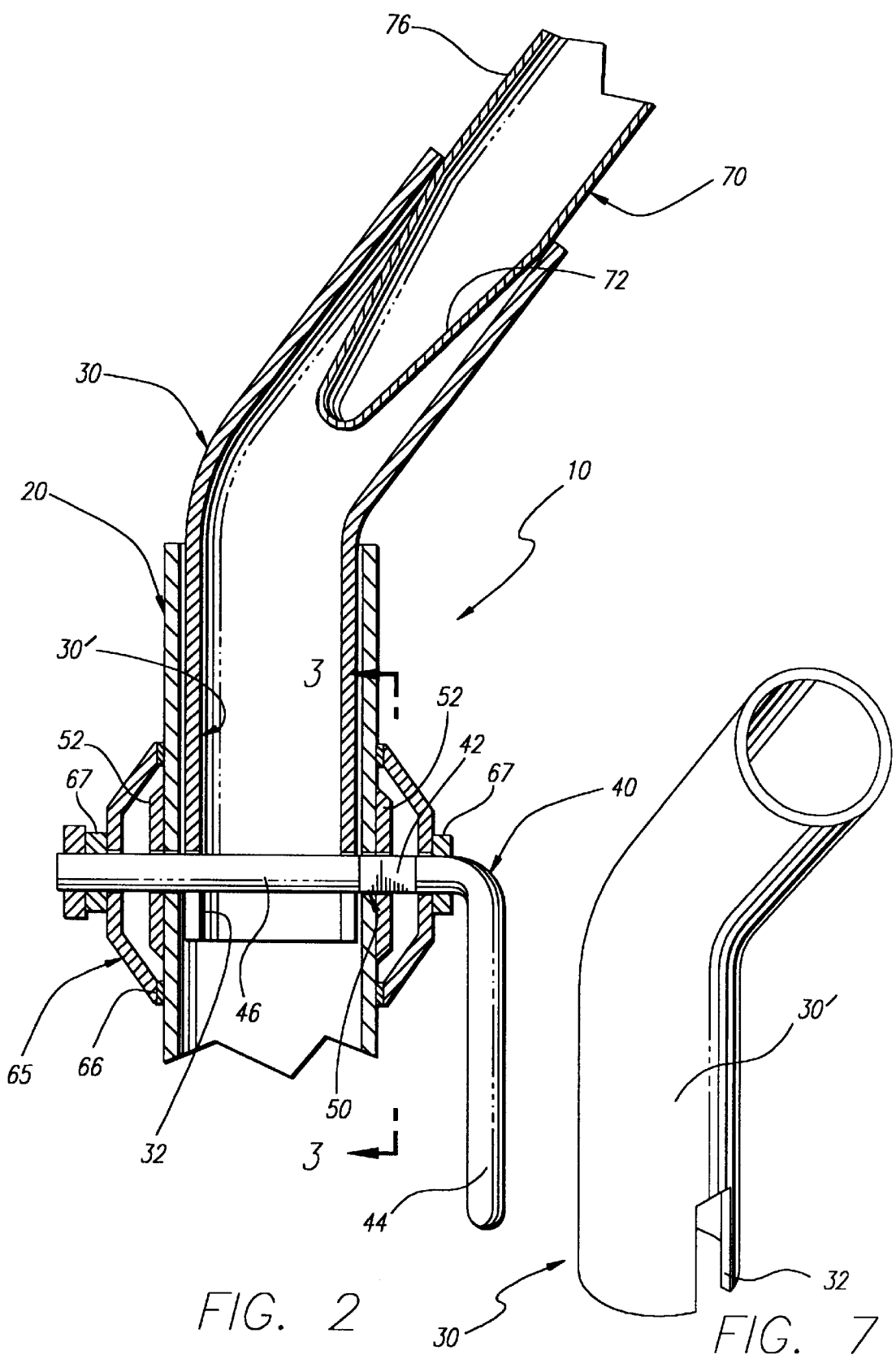
FIG. 2 is a cross-sectional view of the outrigger pivot assembly of the present invention.
FIG. 7 is an isolated perspective view of the positioning member illustrating the engagement slot defined therein.

The positioning member 30 is further structured to rotate relative to the support housing 20 and to in-turn rotate the outrigger fishing assembly 70 upon rotation thereof as a result of the coupled connection. Moreover, the positioning member 30 is structured to matingly engage a handle assembly 40 to provide for this rotation. Specifically, extending out from the support housing 20, and preferably matingly coupled with the positioning member 30 is a handle assembly 40. In particular, the handle assembly 40 is structured to be coupled, either directly or indirectly, with the positioning member 30 so as to rotate the positioning member 30 upon pivoted movement thereof about a perimeter of the support housing 20. To this end, the handle assembly 70 preferably includes an interior engagement segment 46 which engages the positioning member 30, and indeed, preferably extend completely across and through the support housing 20, as illustrated in the preferred embodiment of FIG. 2. Accordingly, rotation of the positioning member 30 is ensured upon pivoted movement of the entire handle assembly 40 about a perimeter of the support housing 20.

In the preferred embodiment, the coupled interconnection between the positioning member 30 and the handle assembly 40 is achieved as a result of an engagement slot 32 defined in the lower end 30' of the positioning member 30. In particular, the preferably single, engagement slot 32 extends across the positioning member 30 and slides onto and over the interior engagement segment 46 of the handle assembly 40. As such, as the interior engagement segment 46 pivots or rotates about a vertical axis of the support housing 20 due to the pivoted movement of exterior portions of the handle assembly 40 about and through the perimeter of the support housing 20, the positioning member 30 and accordingly the outrigger fishing assembly 70 also rotate.

The outrigger pivot assembly 10 of the present invention further includes a lock assembly. Specifically, the lock assembly, which includes at least a first position and a second position for locked retention, is structured to selectively retain the handle assembly 70 within the corresponding first or second positions, thereby preventing inadvertent movement therefrom while the outrigger fishing assembly 70 is in a desired orientation. As such, each of the first and second positions will define a corresponding position and orientation of the outrigger fishing assembly 70 between the stowed and the extended orientation.

In the preferred embodiment of the present invention, the lock assembly includes at lest one channel 50 defined in the support housing 20. The channel 50, which may be defined directly in the wall of the support housing 20, or may be defined in a thickened collar 52 of the support housing 20, extends completely through a wall of the support housing 20 so as to provide access between the handle assembly 40 and the positioning member 30. Moreover, the channel 50 defines the first position 54, the second position 56, and a connection segment 52 communicably disposed between the first and second positions 54 and 56. In this regard, it is noted that if additional positions are desired, such as for variable positioning of the outrigger fishing assembly 70, further positions may be defined by the channel 50, with corresponding connection segments being communicably disposed between the adjacent positions. Moreover, if the interior engagement segment 46 of the handle assembly 40 extends completely through the support housing 20 as in the preferred embodiment, a second, preferably uniformly dimensioned and oppositely disposed channel should also be provided.

The handle assembly 40 and the channel 50 of the lock assembly are structured and disposed relative to one another so as to permit selective movement of the handle assembly 40, and accordingly selective movement of the positioning member 30 with which the handle assembly 40 is engaged, through the channel 50 and relative to the support housing 20. For example, and as best illustrated in FIGS. 3 and 4, the first and second positions 54 and 56, which preferably include a generally rounded configuration, include a generally larger diameter than the narrower connection segment 58. As such, movement of the handle assembly 40 through the connection segment 58 is restricted unless the handle assembly 40 is affirmatively reoriented. In particular, the handle assembly 40 includes a connection shaft 42 which is disposed and is structured to slidingly move within the channel 50. The connection shaft 42, as best illustrated in cross section in FIGS. 3 and 4 is structured to be rotatable between a locked orientation and an unlocked orientation when positioned within the first and second positions 54 and 56. For example, when in the locked orientation, as seen FIG. 3, a first dimension of the connection shaft 42 is generally larger or wider than the narrow connection segment 58, and as a result the connection shaft 42 cannot enter the connection segment 58 for slided movement therethrough and for alteration of an orientation of the positioning member 30 and accordingly the outrigger fishing assembly 70. Conversely, when the handle assembly 40 is rotated, and the connection shaft 42 rotates within the corresponding first or second position 54 and 56, a second dimension, which is generally narrower than the first dimension and the connection segment 58, now confronts the connection segment 58. As a result, upon pivoted movement of the handle assembly 40 about a perimeter of the support housing 20, the connection shaft 42 slides into and through the connection segment 58 from one position to another, as illustrated in FIG. 4.

Accordingly, looking at FIGS. 3–6, when the handle assembly 40 is in a locked orientation, as in FIGS. 3 and 5, the dimension of the connection shaft 42 which confronts the connection segment 58 is wider and no movement out of the corresponding position is capable. Indeed, it is noted that in the preferred embodiment, this locked orientation is structured to provide a gripping portion 44 of the handle assembly 40 in a generally vertically disposed, downwardly depending orientation, as in FIG. 5. Although it is seen, that other orientations of the handle assembly 40 may define the locked orientation merely by placing a bracket or other stopper element so as to retain the handle assembly 40 in the desired orientation, the preferred embodiment, as in FIG. 5, is ideal as the normal influences of gravity will function to ensure that the handle assembly 40 is maintained in the locked orientation unless affirmatively moved by a user. Moreover, such an orientation does not permit slippage and/or movement of the outrigger fishing assembly 70 from the selected orientation, and even minor giggling and/or movement can be substantially eliminated by appropriately sizing the first dimension of the connection shaft 42 to precisely correspond the interior dimensions of the first or second positions 54 and 56. Still, a metal or nylon washer or other bushing 67 may be provided about the handle assembly 40 so as to permit tightening thereof to a point where rotation is permitted only if the gripping portion 44 is affirmatively moved. This is especially the case in an embodiment wherein the interior engagement segment 46 extends completely through the support housing 20 and is retained by a clip, flange, bolt or like fastener. Also in this embodiment, preferably a metal washer 67 is welded or integrally formed on the side of the interior engagement segment adjacent the gripping portion 44 so as to provide a surface against which the bolt may be tightened to the desired frictional engagement without compressing interior elements.

Looking now to FIGS. 4 and 6, when pivoted movement of the outrigger fishing assembly 70 is desired, the gripping portion 44 of the handle assembly 40 is grasped and moved, preferably up to a generally horizontal orientation, although it is noted that the configuration of the connection shaft 42 may be such that only partial or additional pivoted movement in either direction may be sufficient. Nevertheless, once pivoted into the unlocked orientation, a user can merely push or pull on the handle assembly 40, pivoting the handle assembly 40 about the perimeter of the support housing 20 and causing corresponding rotation of the positioning member 30 and outrigger fishing assembly 70.

In order to provide an attractive and aesthetically appealing outrigger pivot assembly 10, the present invention further includes a shroud assembly 65. The shroud assembly 65, which may slide on over an end of the support housing 20, or may be formed in one or more sections structured to be secured with one another in surrounding relation to the support housing 20, is structured to preferably extend completely about a perimeter of the support housing 20, thereby concealing the channel 50 and collar assembly 52. The shroud assembly 65 is structured to permit the handle assembly 40 to extend therethrough into its rotating connection with the positioning member 30. In this regard, it is noted that the handle assembly 40 rotates both relative to the shroud assembly 65 and the positioning member 30, with the washer and/or bushing 67 preventing excessive compression of the shroud assembly and providing frictional engagement that still permits the necessary relative rotation. Furthermore, upon pivoted movement of the handle assembly 40 about a perimeter of the support housing 20, both the shroud assembly 65 and positioning member 30 will correspondingly rotate about or within the perimeter of the support housing 20. Of course, so as to facilitate rotation about a perimeter of the support housing 20, the shroud assembly 65 may also include a series of secondary bushings 66 or other structure between it and the support housing 20 so as to provide for facilitated and/or low friction rotation in a manner that does not excessively wear and so as to provide a generally fluid and/or wind impervious engagement thereabout, so as to protect the lock assembly from the effects of the weather and wind.

More importantly, however, it is also noted that the shroud assembly 65 is structured to maintain the handle assembly 40 generally aligned from both sides of the support housing, upon its pivoted movement through the channel 50. Accordingly, the shroud assembly 65 ensures that the handle assembly 40 does indeed pivot about the perimeter of the support housing 20 and about a vertical axis of the support housing 20 so as to achieve the necessary rotational movement of the positioning assembly 30 and the outrigger fishing assembly 70.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. To rotatably support an outrigger fishing assembly having a shaft bottom end, an outrigger pivot assembly comprising:

a support housing, said support housing being coupled to a support surface, a positioning member structured to receive the shaft bottom end therein and structured to be matingly engaged with said support housing, said positioning member being structured to rotate relative to said support housing and to correspondingly rotate the outrigger fishing assembly upon rotation thereof, a handle assembly extending out from said support housing and structured to rotate said positioning member upon pivoted movement thereof relative to said support housing, a lock assembly including at least a first position and a second position and structured to selectively retain said handle assembly in said first and said second positions so as to prevent inadvertent movement therefrom, said lock assembly including a channel defined in said support housing and structured to define said first position, said second position, and a connection segment communicably disposed therebetween, and said handle assembly being structured to selectively move through said connection segment so as to correspondingly move between said first and said second positions.

2. An outrigger fishing assembly as recited in claim 1 wherein said support housing includes a collar assembly which defines said channel.

3. An outrigger fishing assembly as recited in claim 1 wherein said connection segment is generally narrower than said first position and said second position so as to restrict movement therethrough by said handle assembly.

4. An outrigger fishing assembly as recited in claim 3 wherein said handle assembly includes a connection shaft disposed in said channel, said connection shaft being rotatable between a locked orientation and an unlocked orientation, said unlocked orientation permitting slided movement through said connection segment of said channel and said locked orientation restricting slided movement of said connection shaft out of said first and said second positions and into said connection segment.

5. An outrigger fishing assembly as recited in claim 4 wherein said connection shaft includes a first dimension which is generally wider than said connection segment and confronts said connection segment upon said connection shaft being disposed in said locked orientation, thereby preventing passage of said connection shaft into said connection segment, and a second dimension, which is generally narrower than said connection segment and confronts said connection segment upon said connection shaft being disposed in said unlocked orientation, thereby permitting slided passage of said connection shaft into and through said connection segment.

6. An outrigger fishing assembly as recited in claim 5 wherein said locked orientation includes said handle assembly in a generally vertically disposed, downwardly depending orientation so as to restrict accidental movement into said unlocked orientation due to a normal influence of gravity.

7. An outrigger fishing assembly as recited in claim 1 wherein said handle assembly is coupled directly with said positioning member.

8. An outrigger fishing assembly as recited in claim 7 wherein said handle assembly includes an engagement segment that extends through said support housing and said positioning member includes an engagement slot structured to mate with said engagement segment such that pivoted movement of said handle assembly about a perimeter of said support housing results in corresponding rotation of said positioning member.

9. An outrigger fishing assembly as recited in claim 1 further including a shroud assembly coupled with said handle assembly and structured to rotate about said support housing upon pivoting movement of said handle assembly, said handle assembly being structured to rotate relative to said shroud assembly, and said shroud assembly being structured to conceal said lock assembly and to maintain said handle assembly aligned such that it pivots about a perimeter of said support housing.

10. An outrigger fishing assembly as recited in claim 9 further including a bushing member between said handle assembly and said shroud assembly, said bushing member structured to permit rotation of said handle assembly relative to said shroud assembly while maintaining a sufficient frictional engagement to restrict free, non-affirmative rotation thereof.

11. To rotatably support an outrigger fishing assembly having a shaft bottom end, an outrigger pivot assembly comprising:

a support housing, said support housing being coupled to a support surface, a positioning member structured to receive the shaft bottom end therein and structured to be matingly engaged with said support housing, said positioning member being structured to rotate relative to said support housing and to correspondingly rotate the outrigger fishing assembly upon rotation thereof, a handle assembly extending out from said support housing and structured to rotate said positioning member upon pivoted movement thereof relative to said support housing, a lock assembly including at least a first position and a second position and structured to selectively retain said handle assembly in said first and said second positions so as to prevent inadvertent movement therefrom, said lock assembly including a channel defined in said support housing and structured to define said first position, said second position, and a connection segment communicably disposed therebetween, said handle assembly being structured to selectively move through said connection segment so as to correspondingly move between said first and said second positions, said connection segment being generally narrower than said first position and said second position so as to restrict movement of said handle assembly therethrough between said first and said second positions, said handle assembly including a connection shaft structured to be disposed in said channel, said connection shaft being rotatable between a locked orientation and an unlocked orientation, said unlocked orientation of said handle assembly being structured to permit slided movement of said connection shaft through said connection segment of said channel, said locked orientation of said handle assembly being structured to restrict slided movement of said connection shaft out of said first and said second positions and into said connection segment, and a shroud assembly coupled with said handle assembly and structured to rotate about said support housing upon pivoting movement of said handle assembly about a perimeter of said support housing.

12. An outrigger fishing assembly as recited in claim 11 wherein said handle assembly is structured to rotate relative to said shroud assembly and said shroud assembly is structured to conceal said lock assembly and maintain said handle assembly aligned during pivoted movement thereof.

13. An outrigger fishing assembly as recited in claim 11 wherein said connection shaft includes a first dimension which is generally wider than said connection segment and confronts said connection segment upon said connection shaft being disposed in said locked orientation, thereby preventing passage of said connection shaft into said connection segment, and a second dimension, which is generally narrower than said connection segment and confronts said connection segment upon said connection shaft being disposed in said unlocked orientation, thereby permitting slided passage of said connection shaft into and through said connection segment.

* * * * *